Dec. 14, 1965 M. R. EMERSON ETAL 3,223,855
SWITCHING CIRCUIT
Filed Oct. 29, 1963
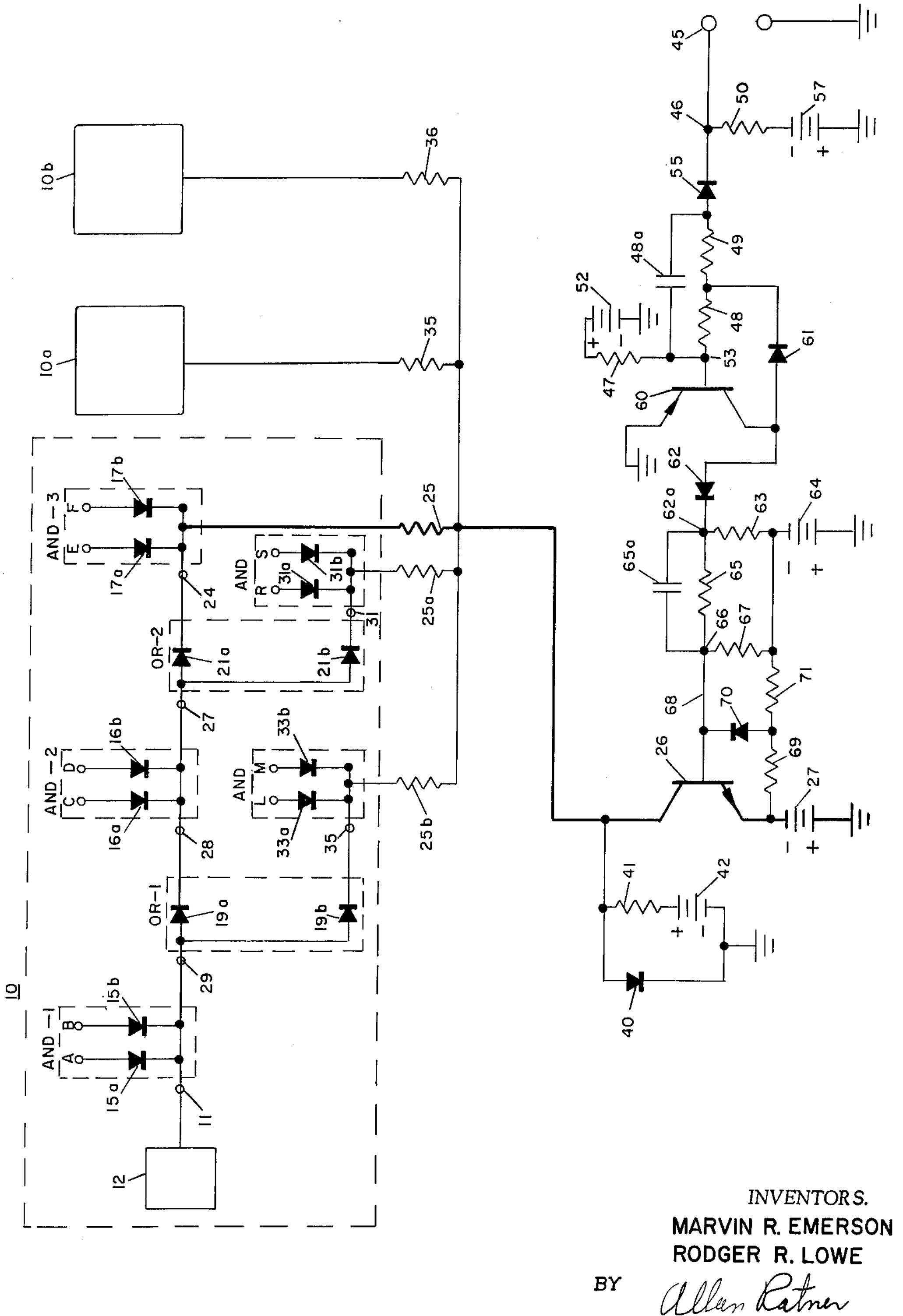
INVENTORS.
MARVIN R. EMERSON
RODGER R. LOWE
BY Allen Ratner United States Patent Office 3,223,855

Patented Dec. 14, 1965

3,223,855
SWITCHING CIRCUIT

Marvin R. Emerson, Tustin, and Rodger R. Lowe, Inglewood, Calif., assignors to Pacific Data Systems, Inc., Santa Ana, Calif., a corporation of California Filed Oct. 29, 1963, Ser. No. 319,840
10 Claims. (Cl. 307—88.5)

This invention relates to a switching circuit and has for an object the provision of a diode logic circuit having switching means to prevent current from flowing through its logic inputs until its respective section of the computer is in an active state.

Heretofore, computers have utilized multilevel diode logic having as inputs, computer logic signals. In typical computers, there is provided a plurality of control states in which one section of the computer may be active while other sections of the computer are inactive. In such computers, all of the diode logic circuits have current flow through their logic inputs even though only one of the sections of the computer at that time may be active.

Accordingly, an object of the present invention is a diode logic circuit in which current is prevented from flowing through its logic inputs when the section of the computer containing that circuit is inactive.

In accordance with the present invention, there is provided a diode logic circuit having means for controlling the application to the circuit of a single source of supply to prevent current from flowing through any one of the logic inputs of the logic circuit when its respective section of the computer is inactive.

In a preferred form of the invention, there is provided a diode logic circuit having a plurality of logic inputs and an output terminal connected to a utilization means. The diode logic circuit includes a supply resistor which is connected by way of a switching transistor to a single source of supply. The input of the switching transistor is connected to means responsive to control signals corresponding to the active and inactive states of that particular section of the computer. Upon application of a control signal corresponding to a computer inactive state, the switching transistor is rendered nonconductive to disconnect the source of supply from the logic circuit so that current is prevented from flowing through any of the logic inputs regardless of the state of the logic signals. In this manner, more than one logic circuit may be connected to a single switching transistor and a single source of supply.

The diode logic circuit may include at least one AND logic gate and at least one OR logic gate with the logic gates being connected in sequence in a logic chain with one type of logic gate being followed in sequence by the other type of logic gate. An output of the last logic gate in the chain is connected to an output utilization means. The supply resistor, which has applied thereto the source of supply, is connected to only one point of the logic circuit and that point is a junction of the two logic gates remote from the utilization means. Each of the diodes of each of the logic gates is poled to provide current now between the logic input and source of supply in a direction which is the same for all of the logic inputs. Thus, with a logic input having applied thereto a logic signal of polarity to render its respective diode conductive there may be traced a flow of current which will be in the same direction as the flow of current for all other logic inputs having that polarity logic signals applied thereto.

In another form of the invention, there is provided an inverting circuit including an input transistor for controlling the conductivity state of the switching transistor. In this manner, the control signal which indicates the active state of the section of the computer is applied to the inverting circuit.

For a more detailed disclosure of the invention and for further objects and advantages thereof, reference is to be had to the following description taken in conjunction with the single figure of the accompanying drawing which schematically illustrates a diode logic and switching circuit embodying the invention.

Referring to the drawing, the invention in one form has been shown as comprising a diode logic circuit 10 which may include a plurality of logic gate chains and as illustrated includes three such chains. The logic inputs to the logic circuit are designated A, B, C, D, E and F. An output terminal 11 of the logic circuit is connected to a utilization means 12 which may be an inverter circuit which is switched from one of its stable states to the other of its stable states upon a change in state of a logic signal appearing at output terminal 11.

For the purpose of this description, it will be assumed in binary notation that a logic signal "0" or "0" state is represented by a potential substantially equal to ground potential or zero volts and that a logic signal "1" or "1" state is represented by a negative potential V. In this description the terms "state" and "logic signal" will be used interchangeably.

Logic inputs A and B are connected to the anodes of diodes 15*a* and 15*b* respectively which comprise a first AND gate, logic inputs C and D are connected to the anodes of diodes 16*a* and 16*b* respectively which comprise a second AND gate and logic inputs E and F are connected to the anodes of the diodes 17*a* and 17*b* respectively which comprise a third AND gate. A first or gate diode 19*a* is connected between the first and second AND gate and a second OR gate diode 21*a* is connected between the second and third AND gates to complete the logic gate chain. It will now be understood that the logic gate chain of the present invention is defined by a sequence of logic gates with one type of logic gate followed in sequence by the other type of logic gate with the last logic gate in the chain (the first AND gate) being connected to the output utilization means 12.

The logic gate chain has a single source of supply which may be traced from a junction of the two logic gates most remote from the utilization means 12 (the third AND gate and the second OR gate) and by way of a supply resistor 25, through a switching transistor 26 of the NPN type to a negative terminal of a battery 27, the positive terminal of which is connected to ground.

The operation of the logic gate chain as above described may best be understood by assuming different logic input signals to the logic gates. For example, if the logic inputs A, B, C, D, E and F are all in a 1 state then a negative potential corresponding to a 1 state is applied to the anodes of each of the diodes 15*a*, 15*b*, 16*a*, 16*b*, 17*a* and 17*b* rendering them nonconductive. Thus, considering the third AND gate with transistor 26 conductive, the negative potential of the battery 27 will be substantially applied to the common connection of the diodes 17*a* and 17*b*. With these diodes nonconductive, the negative potential will appear at the terminal 24 as a 1 logic signal. As a result of that negative potential the second OR gate diode 21*a* is rendered conductive so that the negative potential appears at the terminal 27. With both diodes 16*a* and 16*b* rendered nonconductive by the 1 logic signals C and D respectively, then the foregoing negative signal appears at the second AND gate output terminal 28. In this manner, the second AND gate produces a 1 logic signal output when the terminal 27 is in a 1 state and the logic input C is in a 1 state, and the logic input D is in a 1 state.

In similar manner, first OR gate diode 19*a* is rendered conductive so that a 1 logic signal appears at its output terminal 29. Thus, with the terminal 29 in a 1 state and with 1 logic signals being applied to both logic inputs A and B of the first AND gate, the diodes 15*a*, 15*b* are nonconductive so that a 1 logic output signal is produced at the output terminal 11, such 1 logic signal is effective to switch the utilization means 12 from one to the other of its states. Thus, it has been shown that with all of the logic inputs A–F in a 1 state, the negative potential applied by way of the supply resistor 25 is effectively transmitted to the output terminal 11 of the logic circuit 10.

In an additional example of the operation of the logic gate chain, it may be assumed that the logic input F is in a 0 state while all of the remaining logic inputs A–E are in a 1 state. Thus, a ground potential corresponding to a 0 logic signal is effective to render conductive diode 17*b* so that the potential appearing at the output terminal 24 is a ground potential indicating a 0 logic signal. Thus, with a 0 and a 1 logic signal applied to the third AND gate, there is produced a 0 logic signal as an output which is in accordance with the truth table. It will be noted that with diode 17*b* conductive, a current flow may be traced by way of the F logic input, diode 17*b*, through supply resistor 25, conductive switching transistor 26 to the battery 27.

With terminal 24 at ground potential representing a 0 logic signal, the OR gate diode 21*a* is rendered nonconductive. If it be assumed that the remaining OR gate diode 21*b* is also maintained nonconductive as a result of a 0 logic signal applied thereto then a 0 logic signal will appear at the output terminal 27 of the second OR gate. Such 0 logic signal or ground potential is applied from terminal 27 to the output terminal 28 of the second AND gate regardless of the state of the logic inputs C and D.

In manner similar to the operation of the second OR gate, the first OR gate will operate so that the output terminal 29 will be at ground potential corresponding to a 0 logic signal which will be applied to the logic circuit output terminal 11 regardless of the state of the logic inputs A and B.

From the foregoing, it will be seen that if logic input F is in a 0 state then the output terminal 11 will be in a 0 state and the utilization means 12 will not be switched. In similar manner, it will be seen that if logic inputs E and F are in a 1 state, but if either or both logic inputs C and D are in a 0 state, then a 0 logic signal will be produced at the terminal 28 which renders diode 19*a* nonconductive so that a 0 logic signal is produced at the output terminal 11. It will now be understood that if any one, or any combination, of the inputs A–F are in a 0 state then the output terminal 11 will be in a 0 state which is in accordance with the truth table for the logic circuit.

The foregoing explanation was based on the assumption that 0 logic signals were applied to the inputs of the OR gate diodes 21*b* and 19*b*. It will be understood that to the right of each of OR diodes 21*b* and 19*b* there is connected a respective gate chain which operates in a manner similar to the gate chain described above. For example, if logic inputs R and S of an AND gate are in a 1 state, the respective diodes 31*a* and 31*b* are rendered nonconductive and output terminal 31 is in a 1 state as a result of the negative potential applied by way of the battery 27, conductive switching transistor 26 and supply resistor 25*a*. Thus, OR diode 21*b* is rendered conductive so that a negative potential appears at the output terminal 27 corresponding to a 1 state output. Therefore, if logic inputs C and D and logic inputs A and B are all in a 1 state, then there will be produced a 1 state output at the output terminal 11.

In similar manner, if the logic inputs L and M of an AND gate are in a 1 state, the diodes 33*a* and 33*b* will be rendered nonconductive and a negative potential corresponding to a 1 state will be produced at the output terminal 35. This negative potential is applied to terminal 35 by way of the supply resistor 25*b*, transistor 26 and to the negative side of the battery 27. As a result, OR diode 19*b* is rendered conductive to produce a 1 logic signal at terminal 29 and, if logic inputs A and B are in a 1 state, there will be produced at the output terminal 11 a 1 logic signal output.

It will be understood by those skilled in the art that many more logic circuits such as logic circuit 10 may have as their source of supply the battery 27. For example, as illustrated, the source of supply 27 is connected by way of the switching transistor 26 through resistors 35 and 36 to switching circuits 10*a* and 10*b* respectively.

As previously described, if either or both of the logic inputs E, F are in a 0 state, then current will flow between each such 0 state logic input and the battery 27. In addition, if both logic inputs E and F are in a 1 state, but either or both logic inputs C and D are in a 0 state then current will flow from each such 0 state logic input through its respective diode, and through OR diode 21*a*, resistor 25, transistor 26 to the battery 27. In similar manner, if logic inputs C, D, E and F are in a 1 state, but either or both logic inputs A and B are in a 0 state then current will flow from each such 0 state logic input through its respective diode, and through diodes 19*a* and 21*a*, resistor 25, transistor 26 to the battery 27. In this manner, current flows through each and every such 0 state logic input in the same direction. Such current flows even though the section of the computer containing the logic circuit may be inactive.

It is well understood by those skilled in the art that there may be many such logic circuits in inactive sections of a computer, and the magnitude of the current flowing through such circuits may be considerable. Thus, in accordance with the present invention, the switching transistor 26 is rendered conductive in response to a control signal corresponding to a computer active state and is rendered nonconductive in response to a control signal corresponding to a computer inactive state. With transistor 26 conductive the diode logic circuit operates in the manner above described. However, with switching transistor 26 nonconductive, it will be seen that the battery 27 is effectively disconnected from the logic circuits and, thus, none of the logic inputs may draw current. In this manner, there is effected a large saving in the logic current required to be supplied to the logic circuits.

When transistor 26 is nonconductive and all of the logic inputs A–F are in a 1 state, then the terminals 24, 28 and 11 may have a tendency to increase in potential in a negative direction from ground as a result of the leakage currents drawn by each of the reversed biased diodes 15*a*, 15*b*, 16*a*, 16*b*, 17*a* and 17*b*. Such leakage current might increase in a negative direction until equal in magnitude to a 1 logic signal but for the operation of the biasing network including a diode 40 in series circuit relation with a resistor 41 and a battery 42.

The cathode of diode 40 is connected to ground and to the negative side of battery 42 which is of sufficient potential to maintain diode 40 conductive. With diode 40 conductive, there is produced a slightly positive potential at its anode which is applied to the common junction of the supply resistors 25, 25*a*, 25*b*, 35 and 36. In this manner, that common junction is maintained at a slightly positive potential when transistor 26 is nonconductive so that the potential at the terminals 24, 27, 28, 29 and 11 is maintained at substantially ground potential even though all of the logic inputs are in a 1 state potential.

In accordance with one form of the invention, the switching transistor 26 is rendered conductive when its section of the computer is in an active state as indicated for example by a control signal in a 1 state and transistor 26 is rendered nonconductive when its section of the computer is in an inactive state which is indicated for example by a control signal in a 0 state. Such control signals are applied to the input terminal 45 which is connected to a junction 46 of a voltage divider network comprising resistors 47, 48, 49 and 50. The supply circuit for this network may be traced from the positive terminal of battery 52 (the negative terminal of which is connected to ground) through resistor 47, junction 53, resistors 48 and 49, through diode 55, junction 46 and then by way of resistor 50 to the negative terminal of battery 57, the positive terminal of which is connected to ground. Terminal 53 of the voltage divider is connected to the base of a transistor 60 of the PNP type, the emitter of which is connected to ground and the collector of which is connected by way of an antisaturation bias diode 61 to the junction of resistors 48 and 49.

With the control signal in a 1 state, a negative potential is applied to terminal 45 which is connected to the junction. Thus, the potential of the junction 53 of the voltage divider changes in a negative direction until transistor 60 is rendered conductive. It will be understood by those skilled in the art that the values of resistors 47 and 50 and the values of the batteries 52 and 57 are selected so that upon application of the 1 state control signal there will be supplied sufficient base current to the transistor 60 to render that transistor conductive.

With transistor 60 conductive, its collector is at substantially ground potential and diode 62 is rendered conductive as a result of a circuit which may be traced by way of that grounded collector through diode 62, resistor 63 and to the negative side of battery 64, the positive side of which is connected to ground. With diode 62 conductive, junction **62*a* is maintained at approximately the potential of the grounded collector. A voltage divider may be traced from that grounded junction by way of resistor 65, junction 66 and resistor 67 to the negative side of battery 64. As a result of the voltage divider action, the junction 66 has applied thereto a negative potential of magnitude less than the potential of battery 64 and determined by the values of resistors 65 and 67. Such negative potential is applied by way of conductor 68 to the base of transistor 26 to render that transistor conductive since that negative potential is of less magnitude than the negative potential applied to the emitter of transistor 26 from supply battery 27. Thus, switching transistor 26 is rendered conductive at the time that a control signal in a 1 state is applied to the input terminal 45** which is in accordance with the assumed conditions.

It will be remembered that with a control signal in a 0 state applied to the input terminal 45, that transistor 60 is rendered nonconductive and, as a result, diode 62 is rendered nonconductive. Thus, the point **62*a* is no longer maintained at ground potential and the potential of point 66 will change to approximately the negative value of battery 64. If the value of battery 64 is selected to be approximately equal to the value of the supply battery 27, then the base of transistor 26 will be at approximately the same potential as its emitter and transistor 26 will be rendered nonconductive. Thus, with a control signal in a 0 state applied to terminal 45, transistor 26** is rendered nonconductive which is in accordance with the assumed conditions.

It will be noted that the emitter of transistor 26 is connected by way of resistor 69 and a diode 70 to its base. An additional resistor 71 is connected from the common connection of the resistor 69 and the diode 70 to the negative side of battery 64. "Speed-up" capacitors **65*a* and 48*a* of the type well-known in the art are connected in shunt with resistors 65 and the series connection of resistors 48 and 49**.

It will be understood by those skilled in the art that the above described detailed embodiment is meant to be merely exemplary and that it is susceptible of modification and variation without departing from the spirit and scope of the invention. For example, the switching transistor 26 may be replaced by switching devices well-known in the art which are controllable by the particular state of a control signal. In addition, the transistor 60 may be utilized to drive a plurality of switching transistors 26 with each of the switching transistors thus driven having the ability to control a plurality of diode logic circuits 10. More than one switching transistor 26 may be connected in series so that only when all such switching transistors are rendered conductive, there is a completed circuit between the battery 27 and the junction of the supply resistors. Further, the polarity of the logic inputs may be reversed so that a positive potential represents a 1 logic signal and a ground potential represents a 0 logic signal. In that event, there is provided a corresponding reversal of the connections of all of the diodes, a corresponding reversal of the polarity of the batteries 27, 42, 52, 57 and 64 and transistors 26 and 60 would be of the PNP and NPN types respectively. Thus, with transistor 26 rendered nonconductive, current is prevented from flowing from the supply battery 27 to the logic inputs.

It will also be understood that a diode logic circuit 10 may be switched by more than one switching transistor. For example, a logic circuit may be connected to two switching transistors by way of well-known isolating diodes so that when either one or both of the switching transistors is conductive, then current may flow through the logic inputs of the logic circuit.

What is claimed is:

1. In a computer, a logic system for preventing current from flowing through its logic inputs when the section of the computer containing said logic system is inactive, comprising at least one diode logic circuit including a plurality of logic gates each having at least one logic input, said logic gates being connected to form at least one logic chain in which current flows through the chain in one direction by way of a current supply junction, output means connected to said chain at a point remote from said junction, and a single supply means including switching means for said logic system connected to said junction and responsive to control signals corresponding to the active state and inactive state of said computer section for application of a supply potential to said junction only during the time of said active state whereby current is prevented from flowing through said logic inputs during the time of said inactive state.

2. The logic system of claim 1 in which there is provided for each said logic chain supply impedance means connected between said junction and said switching means.

3. The logic system of claim 2 in which said diode logic circuit includes at least one AND type diode logic gate and at least one OR type diode logic gate, means for connecting said diode logic gates in sequence to form said logic chain with one type of diode logic gate being followed by the other type of diode logic gate, and each of the diodes of each of said diode logic gates being poled to provide current flow between said logic inputs and said supply means in a direction which is the same for all of said logic inputs.

4. The logic system of claim 2 in which said switching means includes a switching transistor connected between said supply impedance means and said supply means, and input means connected to an input terminal of said switching transistor and having said control signals applied thereto for rendering conductive said switching transistor in response to said active state of said computer section and for rendering nonconductive said transistor in response to said inactive state of said computer section.

5. In a computer, a logic system for preventing current from flowing through its logic inputs when the section of said computer containing said logic system is inactive comprising, at least one diode logic circuit including a plurality of logic gates each having at least one logic input, utilization means connected to an output terminal of said diode logic circuit, a single source of supply for said diode logic circuit connected only to one point thereof remote from said output terminal, and switching means connected in series circuit between said one point and said source of supply for effectively closing and opening said series circuit in response to control signals, means for producing control signals corresponding to the active and inactive states respectively, of said section of said computer and connected to said switching means for opening said series circuit during said inactive state whereby current is prevented from flowing through each of said logic inputs when said series circuit is open.

6. The logic system of claim 1 in which said diode logic circuit includes at least one AND type diode logic gate and at least one OR type diode logic gate, means for connecting said diode logic gates in sequence to form at least one logic chain with one type of diode logic gate being followed by the other type of diode logic gate, and each of the diodes of each of said diode logic gates being poled to provide current flow between said logic inputs and said supply means in a direction which is the same for all of said logic inputs.

7. The logic system of claim 6 in which there is provided for each said logic chain a supply resistor connected between (1) a junction of the two diode logic gates remote from said output terminal and (2) said switching means.

8. A logic system comprising, at least one AND type diode logic gate and at least one OR type diode logic gate, each of said diode logic gates having at least one logic input, means for connecting said diode logic gates in sequence in a logic chain with one type of diode logic gate being followed by the other type of diode logic gate, output utilization means being connected to an output terminal of a diode logic gate at one end of said chain, and a single source of supply for said logic chain connected to a junction of the two diode logic gates remote from said output terminal, each of the diodes of each of said diode logic gates being poled to provide current flow between said logic inputs and said source of supply in a direction which is the same for all of said logic inputs.

9. The logic system of claim 8 in which said connection between said diode logic gates comprises direct connections from one gate to the next succeeding gate in said logic chain.

10. A logic system for preventing current from flowing in its logic inputs until application of a control signal, comprising at least one diode logic circuit including a plurality of logic gates each having at least one logic input, said logic gates being connected to form at least one logic chain in which current flows through said logic chain in one direction by way of a current supply junction, output means connected to said logic chain at a point remote from said junction, impedance means having one end thereof connected to said junction, supply means including a switching circuit connected to another end of said impedance means, and means for applying at predetermined times said control signal to said switching circuit for application of a supply potential to said junction for operation of said logic chain whereby at all other times current is prevented from flowing through said logic inputs.

References Cited by the Examiner

UNITED STATES PATENTS

| | | | |
|---|---|---|---|
| 3,008,056 | 11/1961 | Wahlass | 307—88.5 |
| 3,031,585 | 4/1962 | Frady | 307—88.5 |

ARTHUR GAUSS, *Primary Examiner.*